(12) United States Patent
Wang et al.

(10) Patent No.: US 11,923,719 B2
(45) Date of Patent: Mar. 5, 2024

(54) ENERGY RECOVERY CONTROL METHOD, SYSTEM, AND VEHICLE

(71) Applicant: GREAT WALL MOTOR COMPANY LIMITED, Baoding (CN)

(72) Inventors: Yinlei Wang, Baoding (CN); Tong Kang, Baoding (CN); Gengnan Zhang, Baoding (CN); Zhenmin Jiang, Baoding (CN); Baogang Wang, Baoding (CN); Xiu Liu, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 6 days.

(21) Appl. No.: 17/790,152

(22) PCT Filed: Jan. 11, 2021

(86) PCT No.: PCT/CN2021/071104
§ 371 (c)(1),
(2) Date: Jun. 30, 2022

(87) PCT Pub. No.: WO2021/169633
PCT Pub. Date: Sep. 2, 2021

(65) Prior Publication Data
US 2023/0040763 A1 Feb. 9, 2023

(30) Foreign Application Priority Data
Feb. 24, 2020 (CN) .......................... 202010113378.8

(51) Int. Cl.
*H02J 7/14* (2006.01)
*B60L 7/10* (2006.01)
*B60L 58/15* (2019.01)

(52) U.S. Cl.
CPC .............. *H02J 7/1469* (2013.01); *B60L 7/10* (2013.01); *B60L 58/15* (2019.02); *H02J 7/1446* (2013.01);
(Continued)

(58) Field of Classification Search
CPC ......... H02J 7/1469; H02J 7/1446; B60L 7/10; B60L 58/15; B60L 2240/423; B60L 2240/54; Y02T 10/64
See application file for complete search history.

(56) References Cited

U.S. PATENT DOCUMENTS 6,845,305 B1 * 1/2005 Raftari ................ F02D 41/1497
701/99
7,116,068 B2 * 10/2006 Boesch .................. B60K 6/445
318/560
(Continued)

FOREIGN PATENT DOCUMENTS

| CN | 104494599 | 4/2015 |
|---|---|---|
| CN | 104859459 | 8/2015 |

(Continued)

OTHER PUBLICATIONS

International Search Report for Application No. PCT/CN2021/071104, dated Apr. 22, 2021, (4 pages).

*Primary Examiner* — Pedro J Cuevas
(74) *Attorney, Agent, or Firm* — NIXON PEABODY LLP; Jeffrey L. Costellia (57) ABSTRACT

The present disclosure relates to the field of vehicle technology and provides an energy recovery control method, a system, and a vehicle. The method is applied in a vehicle, and the vehicle comprises a drive motor and a battery electrically connected to the drive motor; a first energy recovery torque curve with respect to the drive motor is pre-configured in the vehicle, and the first energy recovery torque curve is used to indicate a correspondence relation-
(Continued)

ship between vehicle speed and energy recovery torque of the drive motor. The present disclosure performs reduction on a first energy recovery torque curve by means of utilizing a reduction ratio, allowing energy recovery in accordance with a relatively low torque strength when a usable charge power of the battery is unable to satisfy a preset power requirement corresponding to the first energy recovery torque curve.

16 Claims, 5 Drawing Sheets

(52) U.S. Cl.
CPC ..... *B60L 2240/423* (2013.01); *B60L 2240/54* (2013.01)

(56) References Cited

U.S. PATENT DOCUMENTS

| | | | | |
|---|---|---|---|---|
| 7,116,077 B2* | 10/2006 | Raftari | ................. | B60W 20/50 318/800 |
| 8,137,235 B2* | 3/2012 | Aimo Boot | ......... | B60W 10/198 477/4 |
| 8,258,727 B2* | 9/2012 | Dunn | ................... | B60T 13/586 318/434 |
| 8,948,942 B2* | 2/2015 | McGrogan | .............. | B60L 15/20 701/22 |
| 9,656,663 B2* | 5/2017 | Nefcy | ................... | B60K 6/547 |
| 9,744,862 B2* | 8/2017 | Arbitmann | ............... | B60T 1/10 |
| 10,479,211 B2* | 11/2019 | Huh | ........................ | B60L 50/16 |
| 11,230,288 B1* | 1/2022 | Tokarz | ................. | B60W 20/40 |
| 11,235,770 B2* | 2/2022 | Oh | ........................ | B60W 10/10 |
| 11,260,756 B2* | 3/2022 | Liu | ..................... | B60L 15/2009 |
| 11,588,373 B2* | 2/2023 | Peng | ....................... | H02P 25/30 |
| 11,634,138 B2* | 4/2023 | Hashimoto | ............. | B60L 3/108 701/22 |
| 11,772,628 B2* | 10/2023 | Snyder | .................. | B60W 10/11 477/6 |
| 2003/0193310 A1* | 10/2003 | Raftari | ................... | H02P 23/14 318/798 |
| 2004/0103719 A1* | 6/2004 | Raftari | ................. | H02P 25/024 73/114.61 |
| 2004/0134267 A1* | 7/2004 | Boesch | ................... | H02P 25/08 73/114.62 |
| 2009/0066273 A1* | 3/2009 | Dunn | .................. | B60L 15/2009 903/947 |
| 2009/0298641 A1* | 12/2009 | Boot | .................. | B60W 10/196 477/4 |
| 2012/0323416 A1* | 12/2012 | McGrogan | .............. | B60L 15/20 701/1 |
| 2014/0257664 A1* | 9/2014 | Arbitmann | .......... | B60T 8/17551 701/71 |
| 2014/0292072 A1* | 10/2014 | Nakanishi | ............... | B60L 58/22 324/426 |
| 2016/0375893 A1* | 12/2016 | Nefcy | ............. | B60W 30/18127 180/65.265 |
| 2018/0126862 A1* | 5/2018 | Huh | ........................ | B60L 58/12 |
| 2019/0270384 A1* | 9/2019 | Liu | ........................... | B60L 7/10 |
| 2021/0155240 A1* | 5/2021 | Hashimoto | ............. | B60L 3/108 |
| 2021/0163007 A1* | 6/2021 | Oh | ........................ | B60W 10/10 |
| 2022/0169119 A1* | 6/2022 | Liu | ................... | B60L 15/2009 |
| 2022/0194239 A1* | 6/2022 | Zhu | ....................... | H02K 11/049 |
| 2022/0281432 A1* | 9/2022 | Snyder | ................. | B60W 20/40 |
| 2023/0022163 A1* | 1/2023 | Kamio | ................ | B60L 15/2018 |
| 2023/0139991 A1* | 5/2023 | Wu | ..................... | B60L 15/2045 180/65.31 |
| 2023/0158897 A1* | 5/2023 | Linn | ..................... | B60L 3/0084 701/22 |
| 2023/0191917 A1* | 6/2023 | Borretti | ................ | B60L 3/0038 701/22 |

FOREIGN PATENT DOCUMENTS

| | | |
|---|---|---|
| CN | 107933319 | 4/2018 |
| JP | H-10-201008 | 7/1998 |

* cited by examiner

ENERGY RECOVERY CONTROL METHOD, SYSTEM, AND VEHICLE

The present application claims the priority of the Chinese patent application filed on Feb. 24, 2020 before the Chinese Patent Office with the application number of 202010113378.8 and the title of "ENERGY RECOVERY CONTROL METHOD, SYSTEM, AND VEHICLE", which is incorporated herein in its entirety by reference.

TECHNICAL FIELD

The present disclosure relates to the technical field of vehicles, and more particularly, to an energy recovery controlling method, a system, and a vehicle.

BACKGROUND

At present, energy recovery refers to a technique that converts part of the kinetic energy of an electric vehicle into electric energy through magnetoelectric conversion during braking or deceleration and stores it in a power battery, and it generates a certain braking resistance on the driving motor to make the vehicle decelerate or brake at the same time. Due to the energy recovery technique may significantly improve the driving range of electric vehicles, the technique plays an important role in the fields of pure electric and hybrid-power vehicles. At the current stage, in order to increase the driving range of the vehicles, it is adopted to maximize the energy recovery torque intensity to recover more energy. However, since all of the energy-recovery-torque curves are made based on the full power condition of the entire vehicle, they may increase the energy-recovery power to the greatest extent while ensuring an acceptable comfort. However, the energy recovery may be normally performed merely when the available charging power of the battery satisfies the energy-recovery power of the driving electric motor, therefore, when the available recovery power of the battery greatly decreases due to a too high electric quantity or a too low temperature, in order to prevent overcharge of the battery, the originally calibrated energy-recovery-torque curve is restricted by the available power of the battery, which results in that the originally calibrated smooth energy-recovery-torque curve cannot be normally responded, however, the energy recovery is performed at the torque corresponding to the available charging power of the battery. When the vehicle speed has decreased so that the power of the entire vehicle is less than or equal to the available charging power of the battery, the calibrated energy-recovery-torque curve may be normally responded. However, at this point, because the energy-recovery torque suddenly changes, torque step changing happens, whereby the acceleration of the entire vehicle suddenly changes, to cause an intensive impacting sensation, which brings the driving personnel an uncomfortable driving experience.

SUMMARY

In view of the above, the present disclosure provides a method and system for controlling energy recovery and a vehicle, to solve the problem of the conventional mode of energy recovery in electric vehicles that, when the available recovery power of the battery greatly decreases, step changing of the energy-recovery torque easily happens, whereby the acceleration of the entire vehicle suddenly changes, to cause an intensive impacting sensation, which brings the driving personnel an uncomfortable driving experience.

In order to achieve the above object, the technical solutions of the present disclosure are realized as follows:

A energy recovery controlling method, applied to a vehicle, the vehicle comprising a driving electric motor and a battery electrically connected to the driving electric motor, wherein the vehicle is pre-configured with a first energy-recovery-torque curve for the driving electric motor, the first energy-recovery-torque curve is for representing a correspondence relationship between an energy-recovery torque of the driving electric motor and a vehicle speed, and the method includes the steps of:

determining a first target-recovery-power upper-limit value according to the first energy-recovery-torque curve;

determining an available-charging-power upper-limit value of the battery;

when the available-charging-power upper-limit value is less than the first target-recovery-power upper-limit value, determining an inflection-point vehicle speed according to the available-charging-power upper-limit value and the first energy-recovery-torque curve, wherein the inflection-point vehicle speed refers to a vehicle speed that corresponds to a torque point in the first energy-recovery-torque curve where an energy-recovery power is equal to the available-charging-power upper-limit value;

detecting an energy-recovery signal and a current vehicle speed of the vehicle, and determining a reduction proportion of the first energy-recovery-torque curve according to a result of the detection on the energy-recovery signal, the current vehicle speed, the inflection-point vehicle speed, the available-charging-power upper-limit value and the first target-recovery-power upper-limit value;

performing a reducing adjustment to the first energy-recovery-torque curve according to the reduction proportion, to form a second energy-recovery-torque curve; and when the available-charging-power upper-limit value is less than the first target-recovery-power upper-limit value, according to the second energy-recovery-torque curve, controlling the driving electric motor to recover energy and charging the battery when the energy-recovery signal is detected.

Optionally, in the method, the vehicle is pre-configured with a reducing-regulation condition; and the step of according to the result of the detection on the energy-recovery signal, the current vehicle speed, the inflection-point vehicle speed, the available-charging-power upper-limit value and the first target-recovery-power upper-limit value, determining the reduction proportion of the first energy-recovery-torque curve includes:

when the energy-recovery signal is detected and the current vehicle speed is greater than the inflection-point vehicle speed, controlling the reducing-regulation condition to be in an activated state;

when the energy-recovery signal is not detected, controlling the reducing-regulation condition to be in a turning-off state;

when the energy-recovery signal is detected and the current vehicle speed is less than or equal to the inflection-point vehicle speed, controlling the reducing-regulation condition to maintain being in a current state;

when the energy-recovery signal is detected and the reducing-regulation condition is in the activated state, according to the available-charging-power upper-limit value and the first target-recovery-power upper-limit value, determining the reduction proportion of the first energy-recovery-torque curve; and when the energy-recovery signal is detected and the reducing-regulation condition is in the turning-off state, determining the reduction proportion of the first energy-recovery-torque curve to be 1.

Optionally, the method further comprises:

when the available-charging-power upper-limit value is greater than or equal to the first target-recovery-power upper-limit value, according to the first energy-recovery-torque curve, controlling the driving electric motor to recover energy and charging the battery when the energy-recovery signal is detected.

Optionally, in the method, determining the reduction proportion of the first energy-recovery-torque curve according to the available-charging-power upper-limit value and the first target-recovery-power upper-limit value includes:

determining a proportional factor by using a ratio of the available-charging-power upper-limit value to the first target-recovery-power upper-limit value; and acquiring a predetermined correction factor, and determining the reduction proportion by using the proportional factor and the predetermined correction factor.

Optionally, in the method, a second target-recovery-power upper-limit value determined by using the second energy-recovery-torque curve is equal to the available-charging-power upper-limit value of the battery.

Another object of the present disclosure is to provide a system for controlling energy recovery, applied to a vehicle, the vehicle comprising a driving electric motor and a battery electrically connected to the driving electric motor, wherein the vehicle is pre-configured with a first energy-recovery-torque curve for the driving electric motor, the first energy-recovery-torque curve is for representing a correspondence relationship between an energy-recovery torque of the driving electric motor and a vehicle speed, and the system includes:

a first determining module configured for, determining a first target-recovery-power upper-limit value according to the first energy-recovery-torque curve;

a second determining module configured for determining an available-charging-power upper-limit value of the battery;

a third determining module configured for, when the available-charging-power upper-limit value is less than the first target-recovery-power upper-limit value, determining an inflection-point vehicle speed according to the available-charging-power upper-limit value and the first energy-recovery-torque curve, wherein the inflection-point vehicle speed refers to a vehicle speed that corresponds to a torque point in the first energy-recovery-torque curve where an energy-recovery power is equal to the available-charging-power upper-limit value;

a fourth determining module configured for detecting an energy-recovery signal and a current vehicle speed of the vehicle, and determining a reduction proportion of the first energy-recovery-torque curve according to a result of the detection on the energy-recovery signal, the current vehicle speed, the inflection-point vehicle speed, the available-charging-power upper-limit value and the first target-recovery-power upper-limit value;

a reducing-adjustment module configured for, performing a reducing adjustment to the first energy-recovery-torque curve according to the reduction proportion, to form a second energy-recovery-torque curve; and a first controlling module configured for, when the available-charging-power upper-limit value is less than the first target-recovery-power upper-limit value, according to the second energy-recovery-torque curve, controlling the driving electric motor to recover energy and charging the battery when the energy-recovery signal is detected.

Optionally, in the system, the vehicle is pre-configured with a reducing-regulation condition; and the fourth determining module includes:

a first controlling submodule configured for, when the energy-recovery signal is detected and the current vehicle speed is greater than the inflection-point vehicle speed, controlling the reducing-regulation condition to be in an activating state;

a second controlling submodule configured for, when the energy-recovery signal is not detected, controlling the reducing-regulation condition to be in a turning-off state;

a third controlling submodule configured for, when the energy-recovery signal is detected and the current vehicle speed is less than or equal to the inflection-point vehicle speed, controlling the reducing-regulation condition to maintain being in a current state;

a first determining submodule configured for, when the energy-recovery signal is detected and the reducing-regulation condition is in the activated state, according to the available-charging-power upper-limit value and the first target-recovery-power upper-limit value, determining the reduction proportion of the first energy-recovery-torque curve; and a second determining submodule configured for, when the energy-recovery signal is detected and the reducing-regulation condition is in the turning-off state, determining the reduction proportion of the first energy-recovery-torque curve to be 1.

Optionally, the system further includes:

a second controlling module configured for, when the available-charging-power upper-limit value is greater than or equal to the first target-recovery-power upper-limit value, according to the first energy-recovery-torque curve, controlling the driving electric motor to recover energy, and charging the battery when the energy-recovery signal is detected.

Optionally, in the system, the first determining submodule includes:

a first determining unit configured for, determining a proportional factor by using a ratio of the available-charging-power upper-limit value to the first target-recovery-power upper-limit value; and a second determining unit configured for acquiring a predetermined correction factor, and determining the reduction proportion by using the proportional factor and the predetermined correction factor.

Optionally, in the system, a second target-recovery-power upper-limit value determined by using the second energy-recovery-torque curve is equal to the available-charging-power upper-limit value of the battery.

As compared with the prior art, the method and system for controlling energy recovery according to the present disclosure has the following advantages:

When the actual available-charging-power upper-limit value of the battery is less than the first target-recovery-power upper-limit value of the driving electric motor, firstly determining the inflection-point vehicle speed where the corresponding energy-recovery power in the calibrated first energy-recovery-torque curve is the available-charging-power upper-limit value; subsequently, according to a result of the detection on the energy-recovery signal, the current vehicle speed, the inflection-point vehicle speed, the available-charging-power upper-limit value and the first target-recovery-power upper-limit value, determining a reduction proportion of the first energy-recovery-torque curve; subsequently, according to the reduction proportion, performing a reducing adjustment to the first energy-recovery-torque curve, to form a second energy-recovery-torque curve; and subsequently, when the energy-recovery signal is detected, according to the second energy-recovery-torque curve, controlling the driving electric motor to recover energy, and charging the battery. The first energy recovery torque curve is reduced by using the reduction proportion, reduces the first energy-recovery-torque curve, so that when the available charging power of the battery may not satisfy the power demand corresponding to the predetermined first energy-recovery-torque curve, performing energy recovery according to the lower torque intensity, to alleviate or even eliminate torque step changing, thereby improving the driving comfort.

Yet another object of the present disclosure is to provide a vehicle, wherein the vehicle comprises the system for controlling energy recovery stated above.

The vehicle has the same advantages as those of the above method and system for controlling energy recovery over the prior art, which is not discussed herein further.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are embodiments of the present disclosure, and a person skilled in the art may obtain other figures according to these figures without paying creative work.

The drawings, which form part of the present disclosure, are intended to provide a further understanding of the present disclosure. The illustrative embodiments of the present disclosure and their explanation are intended to interpret the present disclosure, and do not inappropriately limit the present disclosure. In the drawings.

DETAILED DESCRIPTION OF THE EMBODIMENTS

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

The embodiments of the present application will be described in further detail below with reference to the drawings. Although the drawings illustrate the embodiments of the present application, it should be understood that the present application may be implemented in various forms, which should not be limited by the embodiments illustrated herein. In contrast, the purpose of providing those embodiments is to more clearly understand the present application, and to completely convey the scope of the present application to a person skilled in the art.

It should be noted that, subject to the avoiding of any conflict, the embodiments and the features of the embodiments of the present disclosure may be combined.

The present disclosure will be described in detail below with reference to the drawings and the embodiments.

Figure 1:
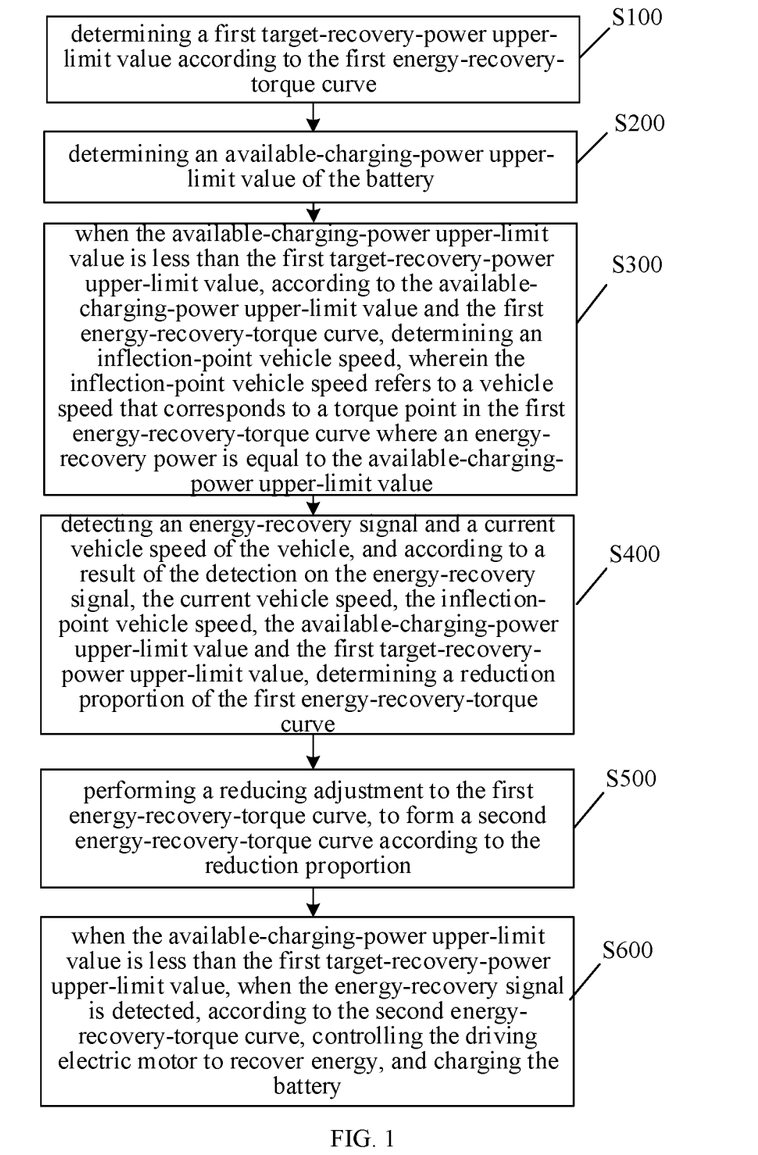
FIG. 1 is a schematic flow chart of the energy recovery controlling method according to an embodiment of the present disclosure.

Referring to FIG. 1, FIG. 1 shows a schematic flow chart of the energy recovery controlling method according to an embodiment of the present disclosure, applied to a vehicle, the vehicle comprising a driving electric motor and a battery electrically connected to the driving electric motor, wherein the vehicle is pre-configured with a first energy-recovery-torque curve for the driving electric motor, the first energy-recovery-torque curve is for representing a correspondence relationship between an energy-recovery torque of the driving electric motor and a vehicle speed, and the method comprises the steps S100-S600.

In an embodiment of the present disclosure, the driving electric motor may be driven by the electric energy of the battery to drive the vehicle. Meanwhile, when the vehicle needs to brake or decelerate, the driving electric motor may also charge the battery after magnetoelectrical converting part of the kinetic energy of the vehicle into electrical energy, to store the converted electric energy in the battery, thereby realizing the purpose of energy recovery.

The first energy-recovery-torque curve represents the correspondence relationship between the energy-recovery torque of the driving electric motor and the vehicle speed. In other words, regarding each of different vehicle-speed states, there is a unique energy-recovery torque corresponding to the vehicle speed, moreover, a good driving comfort and a high energy-recovery power may be achieved by energy recovery and electricity generation according to the first energy-recovery-torque curve. Considering that the energy-recovery power is the highest when the entire vehicle is in the full-power state and the battery does not appear insufficient power in most of times, in other words, the battery may generally satisfy the demand of the driving electric motor on the energy-recovery power, the first energy-recovery-torque curve is made when the entire vehicle is in the full-power state to maximize the energy-recovery power.

In practical applications, the vertical coordinate of the first energy-recovery-torque curve is the energy-recovery torque, and the horizontal coordinate is the vehicle speed, and the points on the curve determine the correspondence relationship between the energy-recovery torque and the vehicle speed. The first energy-recovery-torque curve is required to be pre-determined by experimentation, and different vehicles need to be provided with different first energy-recovery-torque curves because of the difference in performance between the vehicles.

Figure 2:
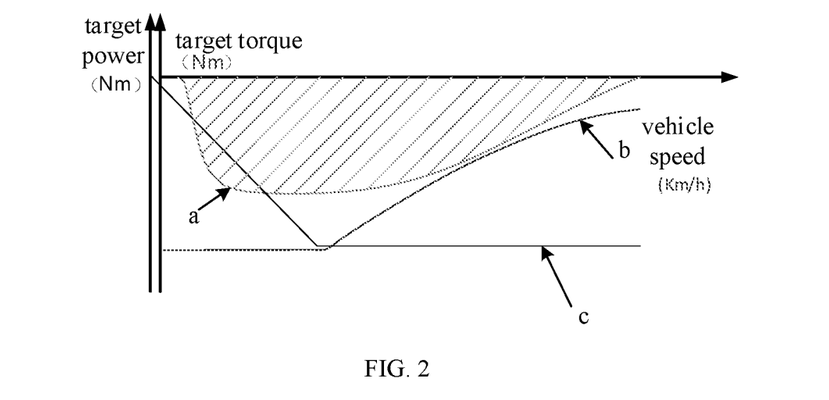
FIG. 2 is a schematic diagram of the relation between the energy-recovery torque and the whole-vehicle-available torque in the normal working state.

Particularly, referring to FIG. 2, FIG. 2 shows a schematic diagram of the relation between the energy-recovery torque and the whole-vehicle-available torque in the normal working state, wherein a represents the first energy-recovery-torque curve, b represents an output-torque curve in an external-characteristic curve, and c represents an output-power curve in the external-characteristic curve. As shown in FIG. 2, the first energy-recovery-torque curve is a smooth torque curve, and, for the same vehicle speed, the torque value corresponding to the first energy-recovery-torque curve is always less than the torque value corresponding to the output-power curve; in other words, the first energy-recovery-torque curve is completed by calibration within the external characteristic of the driving electric motor. On the premise that the available charging power of the battery is sufficient, the driving electric motor recovers energy according to the torque corresponding to the first energy-recovery-torque curve according to the changing of the vehicle speed and charges the battery.

The external-characteristic curve represents the correspondence relationship between the output power and the output torque of the driving electric motor and the vehicle speed. According to the external-characteristic curve, the actual output power and the actual output torque of the driving electric motor under different vehicle speeds may be determined, and the actual output power and the actual output torque are the maximum energy-recovery-available power and the maximum energy-recovery-available torque of the energy recovery by the driving electric motor, respectively. In the external-characteristic curve, with the increasing of the vehicle speed, i.e., with the increasing of the rotational speed of the driving electric motor, the output power of the driving electric motor gradually increases, while its output torque maintains unchanged, at which point the driving electric motor is in a constant-torque state. When the vehicle speed increases to the maximum power value of the output power of the driving motor, with the continuous increasing of the vehicle speed, the output torque of the driving electric motor starts to decrease, while its output power maintains at the state of the maximum power value, at which point the driving electric motor is in a constant-power state.

In practical applications, the external-characteristic curve needs to be predetermined by experimentation, and different vehicles need to be provided with different external-characteristic curves because of the difference in the performances of the vehicles.

Step S100: determining a first target-recovery-power upper-limit value according to the first energy-recovery-torque curve.

In the step S100, the first target-recovery-power upper-limit value is the maximum recovery power that may be generated when the driving electric motor is performing the energy recovery and that is made in advance according to the working state of the entire vehicle. In practical applications, the first target-recovery-power upper-limit value is affected by the external characteristic of the driving electric motor, the maximum theoretical charging power of the battery and the driving comfort.

In the step S100, on the premise that the available charging power of the battery is sufficient to satisfy the demand on the power of the energy recovery of the driving electric motor, according to the changing of the vehicle speed, the driving electric motor cuts the magnetic induction lines to perform magneto-electrical conversion according to the energy-recovery torque corresponding to the first energy-recovery-torque curve, thereby converting the kinetic energy of the vehicle into electric energy, and charges the battery by using the electric energy to complete the energy recovery. Moreover, the energy-recovery power is determined by using the energy-recovery torque and the corresponding vehicle speed, and the first energy-recovery-torque curve represents the correspondence relationship between the energy-recovery torque of the driving electric motor and the vehicle speed. Therefore, the maximum energy-recovery power of the driving electric motor may be determined according to the first energy-recovery-torque curve.

Step S200: determining an available-charging-power upper-limit value of the battery.

In the step S200, the available-charging-power upper-limit value of the battery refers to the maximum charging power that the battery may receive in the current state, i.e., the maximum charging power of the driving electric motor that the battery may receive in the current state. When the available recovery power of the battery greatly decreases due to a too high electric quantity or a too low temperature, when the available charging power of the battery is insufficient to satisfy the corresponding power demand of the driving electric motor according to the first energy-recovery-torque curve, the driving electric motor may merely charge the battery at a power state that does not exceed the available-charging-power upper-limit value of the battery, or, in other words, performs the energy recovery at a power state that does not exceed the available-charging-power upper-limit value of the battery. Therefore, it needs to determine the current available-charging-power upper-limit value of the battery, to facilitate the subsequent determination on whether the battery may currently satisfy the power of the energy recovery of the driving electric motor according to the power demand corresponding to the first energy-recovery-torque curve.

Likewise, the available-charging-power upper-limit value of the battery corresponds to the maximum energy-recovery power of the driving electric motor, and the energy-recovery power is determined by using the energy-recovery torque and the corresponding vehicle speed. Therefore, the corresponding energy-recovery-available torque may be determined by using the determined available-charging-power upper-limit value and the current vehicle speed.

Step S300: when the available-charging-power upper-limit value is less than the first target-recovery-power upper-limit value, determining an inflection-point vehicle speed according to the available-charging-power upper-limit value and the first energy-recovery-torque curve, wherein the inflection-point vehicle speed refers to a vehicle speed that corresponds to a torque point in the first energy-recovery-torque curve where an energy-recovery power is equal to the available-charging-power upper-limit value.

When the available-charging-power upper-limit value of the battery is insufficient to satisfy the corresponding power demand of the driving electric motor according to the first energy-recovery-torque curve, in order to increase the energy-recovery power, the driving electric motor charges the battery at a power state of the available-charging-power upper-limit value of the battery. In other words, the first energy-recovery-torque curve is restricted by the available charging power of the battery, and the driving electric motor may not normally respond thereto, but performs the energy recovery at the torque corresponding to the available charging power of the battery until the vehicle speed is decreased to make the power corresponding to the first energy-recovery-torque curve less than or equal to the available charging power of the battery, the calibrated first energy-recovery-torque curve may be normally responded, but at this point, torque step changing happens due to the sudden increase of the energy-recovery torque.

Figure 3:
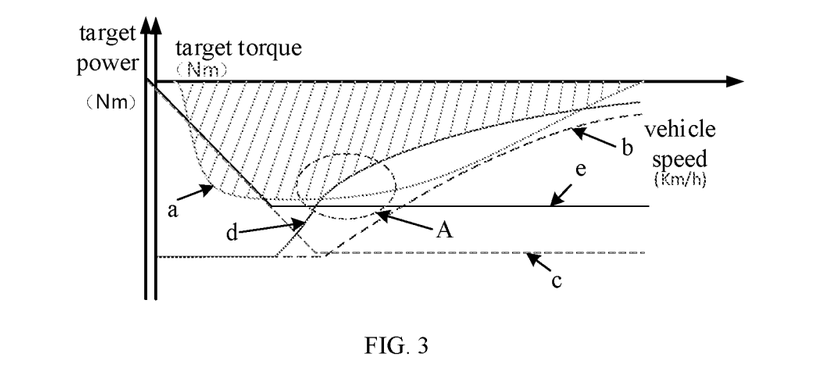
FIG. 3 is a schematic diagram of the relation between the energy-recovery torque and the whole-vehicle-available torque before and after the charging power of the battery is restricted.

Particularly, referring to FIG. 3, FIG. 3 shows a schematic diagram of the relation between the energy-recovery torque and the whole-vehicle-available torque before and after the charging power of the battery is restricted, wherein a represents the first energy-recovery-torque curve, b represents an output-torque curve in an external-characteristic curve, c represents an output-power curve in the external-characteristic curve, d represents an energy-recovery-available-torque curve after the charging power of the battery is restricted, and e represents an energy-recovery-available-power curve after the charging power of the battery is restricted.

As shown in FIG. 3, when the vehicle is in the vehicle-speed state corresponding to the constant-power state of the external-characteristic curve of the driving electric motor, the energy-recovery torque corresponding to the first energy-recovery-torque curve is higher, while the energy-recovery-available torque that the battery may accept is lower, whereby the driving electric motor may merely perform the energy recovery according to the energy-recovery-available torque restricted by the actual available-charging-power upper-limit value of the battery. With the energy recovery, the vehicle speed continuously decreases, the energy-recovery-available torque continuously increases, and the energy-recovery-available power maintains constant. When the vehicle speed is in the vehicle-speed state corresponding to the constant-torque state of the external-characteristic curve of the driving electric motor, the energy-recovery torque corresponding to the first energy-recovery-torque curve is lower, while the energy-recovery-available torque that the battery may accept is higher, whereby the driving electric motor may perform the energy recovery according to the energy-recovery torque corresponding to the first energy-recovery-torque curve. Due to the energy-recovery-available torque is still in a state of continuous increasing with the decreasing of the vehicle at the the vehicle-speed inflection-point area of the external-characteristic curve of the driving electric motor, while the first energy-recovery-torque curve changes smoothly with the decreasing of the vehicle speed, the energy-recovery torque of the driving electric motor suddenly changes at the vehicle-speed inflection-point area to result in torque step changing, as shown by the A in FIG. 3, whereby the acceleration of the entire vehicle suddenly changes, to cause an intensive impacting sensation, and the driving smoothness fluctuates greatly.

In the step S300, the inflection-point vehicle speed refers to the vehicle speed corresponding to the above-described vehicle-speed inflection point, and the vehicle-speed inflection point is the intersection point between the first energy-recovery-torque curve and the energy-recovery-available-torque curve.

The first energy-recovery-torque curve determines the correspondence relationship between the energy-recovery torque and the vehicle speed, and by using the energy-recovery torque and the corresponding vehicle speed, the corresponding energy-recovery power may be determined. Therefore, by using the first energy-recovery-torque curve, it is determined the energy-recovery power in the curve for which vehicle speed is the available-charging-power upper-limit value, and in turn the inflection-point vehicle speed may be determined; in other words, the target energy-recovery torque corresponding to the inflection-point vehicle speed is equal to the energy-recovery-available torque.

In practical applications, when the available-charging-power upper-limit value is less than the first target-recovery-power upper-limit value, there may be multiple intersection points between the first energy-recovery-torque curve and the energy-recovery-available-torque curve. In this case, a lower vehicle speed among the vehicle speeds corresponding to the intersection points is used as the inflection-point vehicle speed. The reason is that, the energy-recovery torque corresponding to the first energy-recovery-torque curve may be responded by the entire vehicle when only in the vehicle-speed state less than the lower vehicle speed. In other words, when there are multiple vehicle speeds that correspond to the torque points in the first energy-recovery-torque curve where the energy-recovery power is equal to the available-charging-power upper-limit value, the lower vehicle speed is used as the inflection-point vehicle speed.

Particularly, the inflection-point vehicle speed may be determined in the following manner:

when it is detected that the available-charging-power upper-limit value $P_{MAX}$ of the battery is less than the first target-recovery-power upper-limit value $P_0$, according to the formula $P=(N*T/9550)$, wherein N is the rotational speed of the driving electric motor, and T is the energy-recovery torque, calculating the power values for all of the rotational-speed points of the first energy-recovery-torque curve, and thus determining the target-power curve corresponding to the first energy-recovery-torque curve; and comparing the obtained target-power curve with the maximum available power of the battery, to determine all of the intersection points between them, i.e., regarding all of the rotational-speed points N when $P_{MAX}-P=0$, taking the minimum value among all of the rotational-speed points N, and by using the formula $V=N*60*3.14*D/(1000*VR)$, determining the corresponding inflection-point vehicle speed $V_1$, wherein D is the tire diameter, and VR is the speed ratio.

Step S400: detecting an energy-recovery signal and a current vehicle speed of the vehicle, and determining a reduction proportion of the first energy-recovery-torque curve according to a result of the detection on the energy-recovery signal, the current vehicle speed, the inflection-point vehicle speed, the available-charging-power upper-limit value and the first target-recovery-power upper-limit value.

Meanwhile, by the above analysis, it may be known that the energy-recovery torque has the step changing because of when the available charging power of the battery is restricted, with the energy recovery, the vehicle speed continuously decreases, and, in the process during which the driving electric motor switches from performing the energy recovery according to the energy-recovery-available torque determined by using the available-charging-power upper-limit value of the battery to perform the energy recovery according to the torque corresponding to the first energy-recovery torque, the energy-recovery-available torque suddenly changes. In view of that, reduction transformation to the first energy-recovery-torque curve may be employed, so that when the vehicle is in the vehicle-speed state corresponding to the constant-power state of the external-characteristic curve of the driving electric motor, reduce the difference between the energy-recovery torque corresponding to the first energy-recovery-torque curve and the energy-recovery-available torque that the battery may accept, i.e., alleviate or even avoid the speed range where the energy recovery is performed according to the energy-recovery-available torque that the battery may accept, thereby alleviating or even eliminating step changing of the energy-recovery torque.

In the step S400, since the existence of the energy recovery signal determines whether the energy recovery is required, and merely when the energy-recovery signal is detected, the energy recovery is required, and the subsequent process is required. Therefore, it is required to detect the energy-recovery signal of the vehicle. In practical applications, the energy-recovery signal is triggered by the braking system and the accelerator pedal of the vehicle. Particularly, when the braking system is operating and the accelerator pedal is released, the energy-recovery signal is triggered.

By the analysis in the step S200, it may be known that, whether the driving electric motor may perform the energy recovery according to the torque corresponding to the first energy-recovery-torque curve is decided jointly by the vehicle speed and the available-charging-power upper-limit value of the battery. Therefore, it is required to detect the current vehicle speed of the vehicle, to determine whether it is required to perform reducing adjustment to the first energy-recovery-torque curve. Moreover, the vehicle speed corresponding to the area where the torque step changing happens may be obtained by using the external-characteristic curve.

In the step S400, the reduction proportion refers to the amplitude of the adjustment when it is required to perform the reducing adjustment to the first energy-recovery-torque curve, i.e., the reduction proportion. The reason is that the available-charging-power upper-limit value of the battery is less than the first target-recovery-power upper-limit value, the energy-recovery torque corresponding to the first energy-recovery-torque curve may not be responded, and in turn the step changing of the energy-recovery torque happens. Therefore, the reduction proportion may be determined by analyzing and comparing the available-charging-power upper-limit value and the first target-recovery-power upper-limit value to obtain the difference between them.

Step S500: performing a reducing adjustment to the first energy-recovery-torque curve according to the reduction proportion, to form a second energy-recovery-torque curve.

In the step S500, by using the reduction proportion determined in the step S400, performing equal-proportion reducing adjustment to the pre-configured first energy-recovery-torque curve, whereby all of the energy-recovery torques corresponding to the same vehicle speed are reduced with the same proportion, the second energy-recovery-torque curve, which may represent the correspondence relationship that is adjusted between the energy-recovery torque and the vehicle speed may be obtained.

Figure 4:
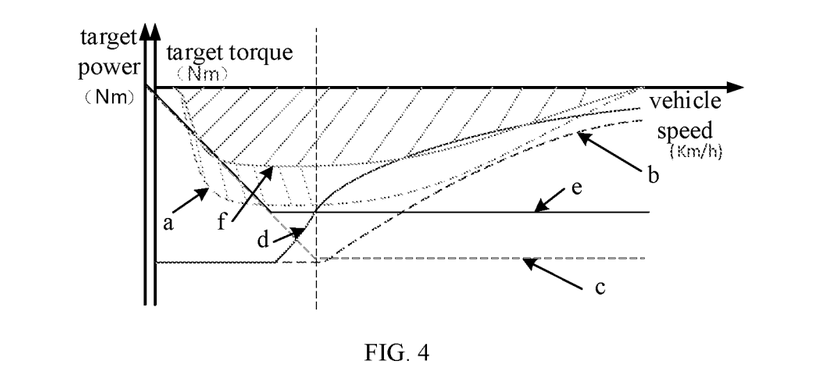
FIG. 4 is a schematic diagram of the relation between the first energy-recovery-torque curve and the second energy-recovery-torque curve.

Particularly, referring to FIG. 4, FIG. 4 shows a schematic diagram of the relation between the first energy-recovery-torque curve and the second energy-recovery-torque curve. in FIG. 4, a represents the first energy-recovery-torque curve, b represents an output-torque curve in an external-characteristic curve, c represents an output-power curve in the external-characteristic curve, d represents an energy-recovery-available-torque curve after the charging power of the battery is restricted, e represents the energy-recovery-available power after the charging power of the battery is restricted, and f represents the second energy-recovery-torque curve.

As shown in FIG. 4, by performing equal-proportion compression to the first energy-recovery-torque curve in the direction of the vertical coordinate, the second energy-recovery-torque curve may be obtained; in other words, for the same vehicle speed, all of the energy-recovery torques corresponding to the second energy-recovery-torque curve are the reduction proportion of the target torque corresponding to the first energy-recovery-torque curve at the vehicle speed. Moreover, as shown in FIG. 4, in most of the cases in which the vehicle is in the vehicle-speed state corresponding to the constant-power state of the external-characteristic curve of the driving electric motor, for the same vehicle speed, the first difference between the second energy-recovery-torque curve and the energy-recovery-available-torque curve is less than the second difference between the first energy-recovery-torque curve and the energy-recovery-available-torque curve, and merely when the vehicle speed approaches the upper limit of the speed of the vehicle, the first difference may be greater than the second difference.

Step S600: when the available-charging-power upper-limit value is less than the first target-recovery-power upper-limit value, according to the second energy-recovery-torque curve, controlling the driving electric motor to recover energy, and charging the battery when the energy-recovery signal is detected.

In the step S600, when the vehicle is in the vehicle-speed state corresponding to the constant-power state of the external-characteristic curve of the driving electric motor, for the same vehicle speed, when the vehicle speed does not approach the upper limit of the speed of the vehicle, then the first difference between the second energy-recovery-torque curve and the energy-recovery-available-torque curve is less than the second difference between the first energy-recovery-torque curve and the energy-recovery-available-torque curve, and merely when the vehicle speed approaches the upper-limit value of the speed of the vehicle, the first difference may be greater than the second difference. However, the vehicle usually does not travel in the speed state that approaches the upper-limit value of the speed for a long time. Therefore, as compared with the first energy-recovery-torque curve, when the available-charging-power upper-limit value is less than the first target-recovery-power upper-limit value and the energy-recovery signal is detected, and the energy-recovery torque of the driving electric motor is controlled by using the second energy-recovery-torque curve, its speed range within which the energy recovery is performed according to the torque restricted by the energy-recovery-available-torque curve is narrowed, which may alleviate or even eliminate the torque step changing caused by the restriction of the available charging power of the battery.

As compared with the prior art, the energy recovery controlling method according to the present disclosure has the following advantages:

When the actual available-charging-power upper-limit value of the battery is less than the first target-recovery-power upper-limit value of the driving electric motor, firstly determining the inflection-point vehicle speed where the corresponding energy-recovery power in the calibrated first energy-recovery-torque curve is the available-charging-power upper-limit value; subsequently, determining a reduction proportion of the first energy-recovery-torque curve according to a result of the detection on the energy-recovery signal, the current vehicle speed, the inflection-point vehicle speed, the available-charging-power upper-limit value and the first target-recovery-power upper-limit value; subsequently, performing a reducing adjustment to the first energy-recovery-torque curve according to the reduction proportion, to form a second energy-recovery-torque curve; and subsequently, when the energy-recovery signal is detected, according to the second energy-recovery-torque curve, controlling the driving electric motor to recover energy, and charging the battery. The first energy recovery torque curve is reduced by using the reduction proportion, so that when the available charging power of the battery may not satisfy the power demand corresponding to the predetermined first energy-recovery-torque curve, performing energy recovery according to the lower torque intensity, to alleviate or even eliminate torque step changing, thereby improving the driving comfort.

Optionally, in an embodiment, the maximum actual recovery power determined by using the second energy-recovery-torque curve is equal to the available-charging-power upper-limit value of the battery.

In the present embodiment, regarding the second energy-recovery-torque curve obtained by the adjustment in the step S500, the determined maximum actual recovery power is exactly equal to the current maximum available charging power of the battery. In the current working state, the driving electric motor may perform the energy recovery according to the torque determined by using the second energy-recovery-torque curve, which does not only prevent torque step changing, to ensure the smoothness of the torque, but also maximize the energy-recovery power.

Optionally, in another embodiment, the vehicle is pre-configured with a reducing-regulation condition; and the step S400 includes the steps S401-S405:

Step S401: controlling the reducing-regulation condition to be in an activated state when the energy-recovery signal is detected and the current vehicle speed is greater than the inflection-point vehicle speed.

In the step S401, on the premise that the available-charging-power upper-limit value is less than the first target-recovery-power upper-limit value, when the energy-recovery signal is detected, it indicates that the energy recovery is required. At this point, when the current vehicle speed is greater than the inflection-point vehicle speed, it indicates that in the subsequent energy recovery, with the decreasing of the vehicle speed, the driving electric motor may pass through the speed range where the torque step changing happens by performing energy recovery according to the first energy-recovery-torque curve. In order to prevent the torque step changing, it is required to adjust the first energy-recovery-torque curve, to activate the reducing-regulation condition, whereby the reducing-regulation condition is in the activated state.

Step S402: controlling the reducing-regulation condition to be in a turning-off state when the energy-recovery signal is not detected.

In the step S402, on the premise that the available-charging-power upper-limit value is less than the first target-recovery-power upper-limit value, when the energy-recovery signal is not detected, it indicates that the energy recovery is not required, and therefore the reducing-regulation condition is turned off, whereby the reducing-regulation condition is in the turning-off state.

Step S403: controlling the reducing-regulation condition to maintain being in a current state when the energy-recovery signal is detected and the current vehicle speed is less than or equal to the inflection-point vehicle speed.

In the step S403, on the premise that the available-charging-power upper-limit value is less than the first target-recovery-power upper-limit value, when the energy-recovery signal is detected, it indicates that the energy recovery is required. At this point, in spite of the precondition that the available-charging-power upper-limit value is less than the first target-recovery-power upper-limit value, when the current vehicle speed is less than the inflection-point vehicle speed, in the subsequent energy recovery, with the decreasing of the vehicle speed, the driving electric motor will not pass through the speed range where the torque step changing happens by performing energy recovery according to the first energy-recovery-torque curve.

The vehicle-speed state that is currently less than or equal to the inflection-point vehicle speed may be caused by the energy recovery using the vehicle speed greater than the inflection-point vehicle speed, or it may also be that the vehicle speed of the vehicle is already in a state that is less than or equal to the inflection-point vehicle speed when the energy recovery starts. For the vehicle speed that is less than or equal to the vehicle speed at the inflection point entered by the vehicle speed greater than the vehicle speed at inflection point through the energy recovery, in the case that the vehicle speed greater than the inflection-point vehicle speed, after the energy recovery, enters the vehicle-speed state less than or equal to the inflection-point vehicle speed, due to the reducing-regulation condition is already in the activated state, i.e., performing the energy recovery according to the second energy-recovery-torque curve obtained by the reducing regulation, in order to ensure the smoothness of the torque, it is required to continue the energy recovery according to the second energy-recovery-torque curve, and therefore the reducing-regulation condition is maintained to be in the activated state. Moreover, in the case that, when the energy-recovery signal starts to be detected, or, in other words, the energy recovery starts to be performed, the vehicle speed of the vehicle is less than or equal to the state of the inflection-point vehicle speed, therefore, the reducing-regulation condition is not activated; in other words, the reducing-regulation condition is in the turning-off state. In the subsequent energy recovery, with the decreasing of the vehicle speed, the driving electric motor will not pass through the speed range where the torque step changing happens by performing the energy recovery according to the first energy-recovery-torque curve either. At this point, the driving electric motor may normally respond to the torque corresponding to the first energy-recovery-torque curve, and in order to increase the energy-recovery power, it is not required to adjust the first energy-recovery-torque curve. Therefore, the reducing-regulation condition is maintained to be in the turning-off state.

Through the steps S401~S403, it may be seen that the embodiments of the present disclosure are implemented within a complete process of the energy recovery according to an energy-recovery-torque curve, which may ensure the smooth effect of the torque in a process of the energy recovery, to achieve a better driving experience.

Step S404: when the energy-recovery signal is detected and the reducing-regulation condition is in the activated state, determining the reduction proportion of the first energy-recovery-torque curve according to the available-charging-power upper-limit value and the first target-recovery-power upper-limit value.

In the step S404, when the energy-recovery signal is detected and the reducing-regulation condition is in the activated state, it indicates that, in the current working state, it is required to perform reducing adjustment to the first energy-recovery-torque curve, to realize a smoother effect of the recovery torque, and alleviate the torque step changing. Moreover, as stated above, due to the available-charging-power upper-limit value of the battery is less than the first target-recovery-power upper-limit value, the energy-recovery torque corresponding to the first energy-recovery-torque curve may not be responded, and in turn the step changing of the energy-recovery torque happens. Therefore, the reduction proportion may be determined by analyzing and comparing the available-charging-power upper-limit value and the first target-recovery-power upper-limit value to obtain the difference between them.

Step S405: when the energy-recovery signal is detected and the reducing-regulation condition is in the turning-off state, determining the reduction proportion of the first energy-recovery-torque curve to be 1.

In the step S405, when the available-charging-power upper-limit value is less than the first target-recovery-power upper-limit value, and the energy-recovery signal is detected and the reducing-regulation condition is in the turning-off state, it indicates that, in the current working state, in the subsequent energy recovery, with the decreasing of the vehicle speed, the driving electric motor will not pass through the speed range where the torque step changing happens by performing the energy recovery according to the first energy-recovery-torque curve either. At this point, the driving electric motor may normally respond to the torque corresponding to the first energy-recovery-torque curve, and therefore, in order to increase the energy-recovery power, the reduction proportion of the first energy-recovery-torque curve is determined to be 1; in other words, the first energy-recovery-torque curve is not adjusted. Accordingly, in the subsequent step S600, the driving electric motor is controlled to recover energy according to the first energy-recovery-torque curve, and charge the battery.

Preferably, in a particular embodiment, the step S404 comprises the steps S441-S442:

Step S441: determining a proportional factor by using a ratio of the available-charging-power upper-limit value to the first target-recovery-power upper-limit value; and Step S442: acquiring a predetermined correction factor, and determining the reduction proportion by using the proportional factor and the predetermined correction factor.

In the present particular embodiment, the proportional factor is determined by using the ratio of the available-charging-power upper-limit value to the first target-recovery-power upper-limit value, and the proportional factor is the theoretical proportion of the adjustment from the first energy-recovery-torque curve to the second energy-recovery-torque curve. However, considering the difference in the performances of different driving electric motors, it is further required to correct the proportional factor by using the predetermined correction factor decided by using the characteristics of the driving electric motor, and the final reduction proportion may be determined.

Figure 5:
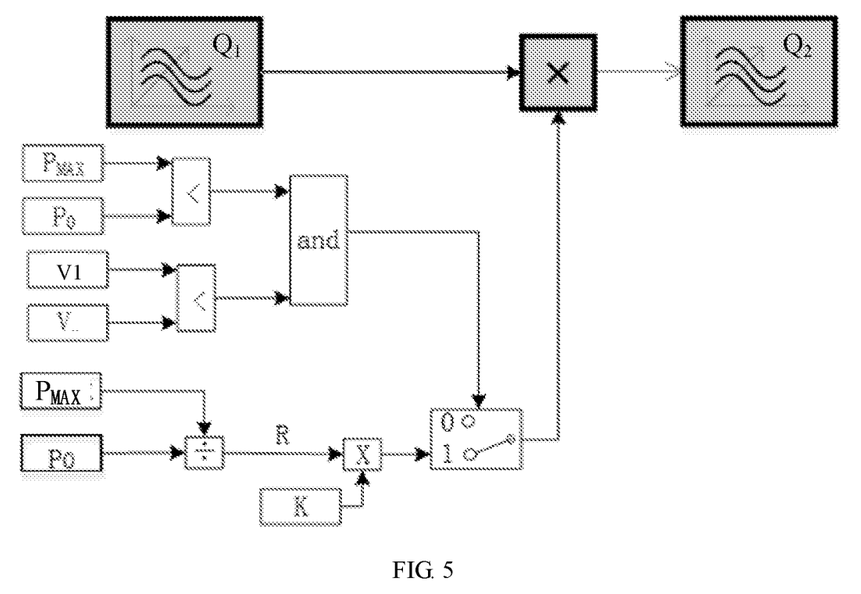
FIG. 5 is a flow chart of the execution of the steps S400-S500 according to an embodiment of the present disclosure.

Referring to FIG. 5, FIG. 5 shows a flow chart of the execution of the steps S400-S500, wherein Q1 represents the first energy-recovery-torque curve, and Q2 represents the second energy-recovery-torque curve. As shown in FIG. 5, when it is determined that the available-charging-power upper-limit value $P_{MAX}$ of the battery is less than the first target-recovery-power upper-limit value $P_0$ corresponding to the first energy-recovery-torque curve and the current vehicle speed V is greater than the inflection-point vehicle speed $V_1$, by using the ratio of $P_{MAX}$ to $P_0$, the proportional factor R is determined, the reduction proportion may be determined by multiplying the proportional factor R and the predetermined correction factor, and subsequently, the second energy-recovery-torque curve may be obtained by multiplying the first energy-recovery-torque curve by the reduction proportion.

Optionally, in an embodiment, the energy recovery controlling method according to the embodiments of the present disclosure further comprises the step S700:

Step S700: when the available-charging-power upper-limit value is greater than or equal to the first target-recovery-power upper-limit value, according to the first energy-recovery-torque curve, controlling the driving electric motor to recover energy, and charging the battery when the energy-recovery signal is detected.

In the present embodiment, when the available-charging-power upper-limit value of the battery is greater than or equal to the first target-recovery-power upper-limit value corresponding to the first energy-recovery-torque curve, it indicates that the available charging power of the battery is sufficient to satisfy the demand on the power of the energy recovery of the driving electric motor, and the case will not happen that the first energy-recovery-torque curve is restricted by the available charging power of the battery and may not be normally responded by the driving electric motor and the energy recovery is performed according to the torque corresponding to the available charging power of the battery. Therefore, in order to increase the energy-recovery power and ensure the torque is smooth, the driving electric motor is controlled to perform energy recovery according to the torque corresponding to the first energy-recovery-torque curve, and charge the battery.

Figure 6:
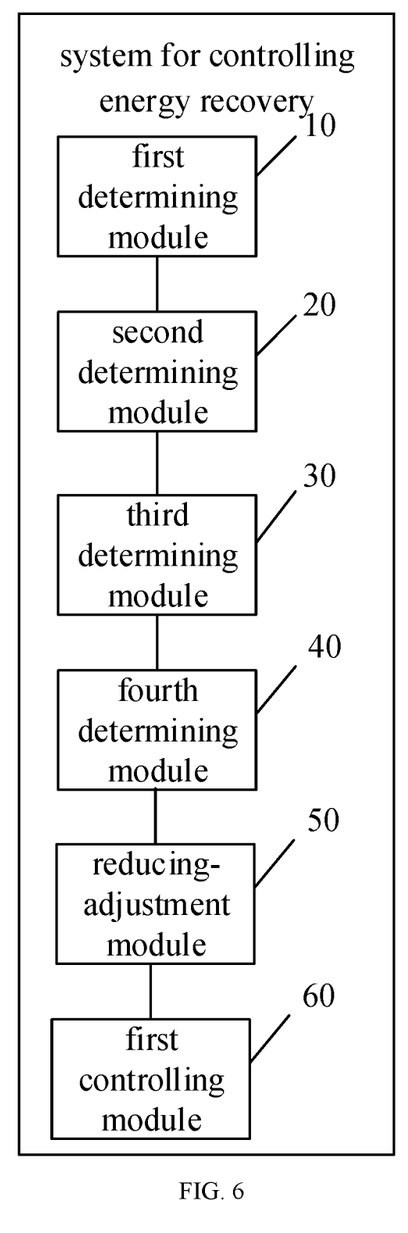
FIG. 6 is a schematic structural diagram of the system for controlling energy recovery according to an embodiment of the present disclosure.

Another object of the present disclosure is to provide a system for controlling energy recovery, applied to a vehicle, the vehicle comprising a driving electric motor and a battery electrically connected to the driving electric motor, wherein the vehicle is pre-configured with a first energy-recovery-torque curve for the driving electric motor, the first energy-recovery-torque curve is for representing a correspondence relationship between an energy-recovery torque of the driving electric motor and a vehicle speed, wherein referring to FIG. 6, FIG. 6 shows a schematic structural diagram of the system for controlling energy recovery according to an embodiment of the present disclosure, and the system comprises:

a first determining module 10 configured for, determining a first target-recovery-power upper-limit value according to the first energy-recovery-torque curve;

a second determining module 20 configured for determining an available-charging-power upper-limit value of the battery;

a third determining module 30 configured for, when the available-charging-power upper-limit value is less than the first target-recovery-power upper-limit value, determining an inflection-point vehicle speed according to the available-charging-power upper-limit value and the first energy-recovery-torque curve, wherein the inflection-point vehicle speed refers to a vehicle speed that corresponds to a torque point in the first energy-recovery-torque curve where an energy-recovery power is equal to the available-charging-power upper-limit value;

a fourth determining module 40 configured for detecting an energy-recovery signal and a current vehicle speed of the vehicle, and determining a reduction proportion of the first energy-recovery-torque curve according to a result of the detection on the energy-recovery signal, the current vehicle speed, the inflection-point vehicle speed, the available-charging-power upper-limit value and the first target-recovery-power upper-limit value;

a reducing-adjustment module 50 configured for, performing a reducing adjustment to the first energy-recovery-torque curve according to the reduction proportion, to form a second energy-recovery-torque curve; and a first controlling module 60 configured for, when the available-charging-power upper-limit value is less than the first target-recovery-power upper-limit value, according to the second energy-recovery-torque curve, controlling the driving electric motor to recover energy, and charging the battery when the energy-recovery signal is detected.

In the system according to the embodiment of the present disclosure, when the actual available-charging-power upper-limit value of the battery is less than the first target-recovery-power upper-limit value of the driving electric motor, the third determining module 30 determining the inflection-point vehicle speed where the corresponding energy-recovery power in the calibrated first energy-recovery-torque curve is the available-charging-power upper-limit value; subsequently, the fourth determining module 40, determining a reduction proportion of the first energy-recovery-torque curve according to a result of the detection on the energy-recovery signal, the current vehicle speed, the inflection-point vehicle speed, the available-charging-power upper-limit value and the first target-recovery-power upper-limit value; subsequently, the reducing-adjustment module 50, performing a reducing adjustment to the first energy-recovery-torque curve according to the reduction proportion, to form a second energy-recovery-torque curve; and subsequently, the first controlling module 60, when the energy-recovery signal is detected, according to the second energy-recovery-torque curve, controlling the driving electric motor to recover energy, and charging the battery. The first energy recovery torque curve is reduced by using the reduction proportion, reduces the first energy-recovery-torque curve, so that when the available charging power of the battery may not satisfy the power demand corresponding to the predetermined first energy-recovery-torque curve, performing energy recovery according to the lower torque intensity, to alleviate or even eliminate torque step changing, thereby improving the driving comfort.

Optionally, in the system, the vehicle is pre-configured with a reducing-regulation condition; and the fourth determining module 40 includes:

a first controlling submodule configured for, when the energy-recovery signal is detected and the current vehicle speed is greater than the inflection-point vehicle speed, controlling the reducing-regulation condition to be in an activated state;

a second controlling submodule configured for, when the energy-recovery signal is not detected, controlling the reducing-regulation condition to be in a turning-off state;

a third controlling submodule configured for, when the energy-recovery signal is detected and the current vehicle speed is less than or equal to the inflection-point vehicle speed, controlling the reducing-regulation condition to maintain being in a current state;

a first determining submodule configured for, when the energy-recovery signal is detected and the reducing-regulation condition is in the activated state, according to the available-charging-power upper-limit value and the first target-recovery-power upper-limit value, determining the reduction proportion of the first energy-recovery-torque curve; and a second determining submodule configured for, when the energy-recovery signal is detected and the reducing-regulation condition is in the turning-off state, determining the reduction proportion of the first energy-recovery-torque curve to be 1.

Optionally, the system further includes:

a second controlling module configured for, when the available-charging-power upper-limit value is greater than or equal to the first target-recovery-power upper-limit value, when the energy-recovery signal is detected, according to the first energy-recovery-torque curve, controlling the driving electric motor to recover energy, and charging the battery.

Optionally, in the system, the first determining submodule includes:

a first determining unit configured for, determining a proportional factor by using a ratio of the available-charging-power upper-limit value to the first target-recovery-power upper-limit value; and a second determining unit configured for acquiring a predetermined correction factor, and determining the reduction proportion by using the proportional factor and the predetermined correction factor.

Optionally, in the system, a second target-recovery-power upper-limit value determined by using the second energy-recovery-torque curve is equal to the available-charging-power upper-limit value of the battery.

Yet another object of the present disclosure is to provide a vehicle, wherein the vehicle includes the system for controlling energy recovery stated above.

The vehicle has the same advantages as those of the above method and system for controlling energy recovery over the prior art, which is not discussed herein further.

The technical details and the advantages of the system and the vehicle have been described in detail above with respect to the method, and are not discussed herein further.

In conclusion, the method and system for controlling energy recovery and the vehicle according to the present application comprise, when the actual available-charging-power upper-limit value of the battery is less than the first target-recovery-power upper-limit value of the driving electric motor, firstly determining the inflection-point vehicle speed where the corresponding energy-recovery power in the calibrated first energy-recovery-torque curve is the available-charging-power upper-limit value; subsequently, according to a result of the detection on the energy-recovery signal, the current vehicle speed, the inflection-point vehicle speed, the available-charging-power upper-limit value and the first target-recovery-power upper-limit value, determining a reduction proportion of the first energy-recovery-torque curve; subsequently, according to the reduction proportion, performing a reducing adjustment to the first energy-recovery-torque curve, to form a second energy-recovery-torque curve; and subsequently, when the energy-recovery signal is detected, according to the second energy-recovery-torque curve, controlling the driving electric motor to recover energy, and charging the battery. The first energy recovery torque curve is reduced by using the reduction proportion, reduces the first energy-recovery-torque curve, so that when the available charging power of the battery may not satisfy the power demand corresponding to the predetermined first energy-recovery-torque curve, performing energy recovery according to the lower torque intensity, to alleviate or even eliminate torque step changing, thereby improving the driving comfort.

A person skilled in the art may clearly understand that, in order for the convenience and concision of the description, the particular working processes of the above-described systems, devices and units may refer to the corresponding processes according to the above-described process embodiments, and are not discussed herein further.

The above description is merely preferable embodiments of the present disclosure, and is not indented to limit the present disclosure. Any modifications, equivalent substitutions and improvements that are made within the spirit and the principle of the present disclosure should fall within the protection scope of the present disclosure.

The above are merely particular embodiments of the present disclosure, and the protection scope of the present disclosure is not limited thereto. All of the variations or substitutions that a person skilled in the art may easily envisage within the technical scope disclosed by the present disclosure should fall within the protection scope of the present disclosure. Therefore, the protection scope of the present disclosure should be subject to the protection scope of the claims.

The above-described device embodiments are merely illustrative, wherein the units that are described as separate components may or may not be physically separate, and the components that are displayed as units may or may not be physical units; in other words, they may be located at the same location, and may also be distributed to a plurality of network units. Some or all of the modules may be selected according to the actual demands to realize the purposes of the solutions of the embodiments. A person skilled in the art may understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the calculating and processing device according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 7:
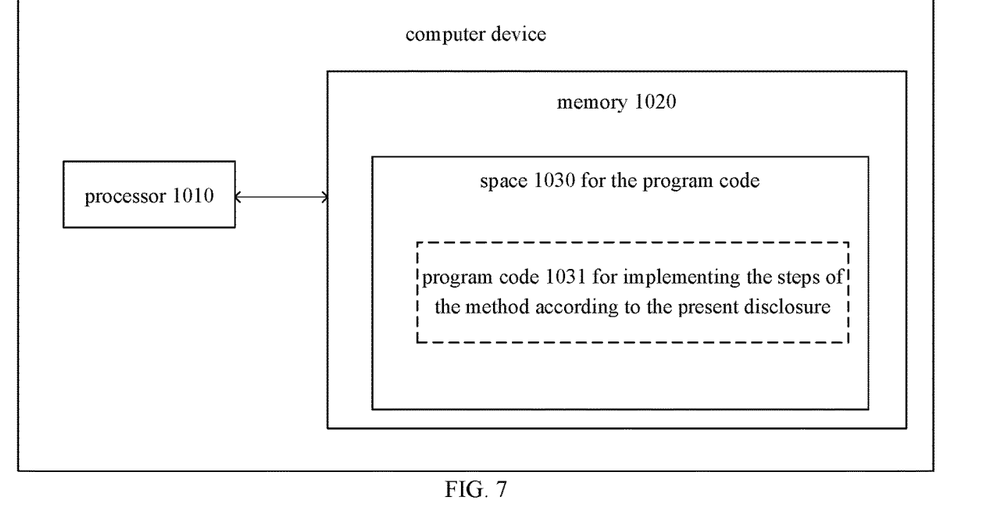
FIG. 7 schematically shows a block diagram of a calculating and processing device for implementing the method according to the present disclosure.
Figure 8:
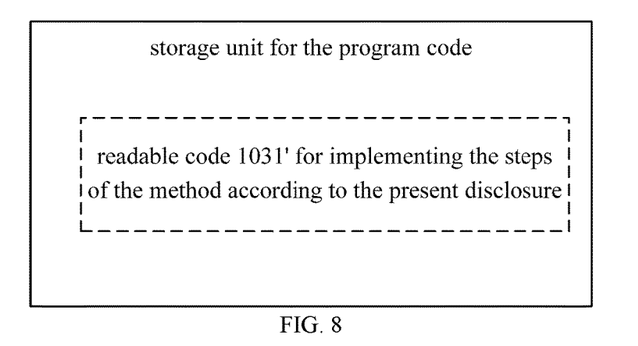
FIG. 8 schematically shows a storage unit for maintaining or carrying a program code for implementing the method according to the present disclosure.

For example, FIG. 7 shows a calculating and processing device that may implement the method according to the present disclosure. The calculating and processing device traditionally comprises a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 8. The storage unit may have storage segments or storage spaces with similar arrangement to the memory 1020 of the calculating and processing device in FIG. 7. The program codes may, for example, be compressed in a suitable form. Generally, the storage unit contains a computer-readable code 1031', which may be read by a processor like 1010. When those codes are executed by the calculating and processing device, the codes cause the calculating and processing device to implement each of the steps of the method described above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same embodiment.

The description provided herein describes many concrete details. However, it may be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he may still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. An energy recovery controlling method, applied to a vehicle, the vehicle comprising a driving electric motor and a battery electrically connected to the driving electric motor, wherein the vehicle is pre-configured with a first energy-recovery-torque curve for the driving electric motor, the first energy-recovery-torque curve is used to indicate a correspondence relationship between an energy-recovery torque of the driving electric motor and a vehicle speed, and the method comprises the steps of:
- by one or more processors, determining a first target-recovery-power upper-limit value according to the first energy-recovery-torque curve;
- by one or more processors, determining an available-charging-power upper-limit value of the battery;
- by one or more processors, when the available-charging-power upper-limit value is less than the first target-recovery-power upper-limit value, determining an inflection-point vehicle speed according to the available-charging-power upper-limit value and the first energy-recovery-torque curve, wherein the inflection-point vehicle speed refers to a vehicle speed that corresponds to a torque point in the first energy-recovery-torque curve where an energy-recovery power is equal to the available-charging-power upper-limit value;
- by one or more processors, detecting an energy-recovery signal and a current vehicle speed of the vehicle, and determining a reduction proportion of the first energy-recovery-torque curve according to a result of the detection of the energy-recovery signal, the current vehicle speed, the inflection-point vehicle speed, the available-charging-power upper-limit value, and the first target-recovery-power upper-limit value;
- by one or more processors, performing a reducing adjustment to the first energy-recovery-torque curve according to the reduction proportion, to form a second energy-recovery-torque curve; and
- by one or more processors, when the available-charging-power upper-limit value is less than the first target-recovery-power upper-limit value, according to the second energy-recovery-torque curve, controlling the driving electric motor to recover energy, and charging the battery when the energy-recovery signal is detected.

2. The method according to claim 1, wherein the vehicle is pre-configured with a reducing-regulation condition; and the step of determining the reduction proportion of the first energy-recovery-torque curve according to the result of the detection of the energy-recovery signal, the current vehicle speed, the inflection-point vehicle speed, the available-charging-power upper-limit value, and the first target-recovery-power upper-limit value comprises:
- when the energy-recovery signal is detected and the current vehicle speed is greater than the inflection-point vehicle speed, controlling the reducing-regulation condition in an activated state;
- when the energy-recovery signal is not detected, controlling the reducing-regulation condition in a turning-off state;
- when the energy-recovery signal is detected and the current vehicle speed is less than or equal to the inflection-point vehicle speed, controlling the reducing-regulation condition to maintain a current state;
- when the energy-recovery signal is detected and the reducing-regulation condition is in the activated state, according to the available-charging-power upper-limit value and the first target-recovery-power upper-limit value, determining the reduction proportion of the first energy-recovery-torque curve; and
- when the energy-recovery signal is detected and the reducing-regulation condition is in the turning-off state, determining the reduction proportion of the first energy-recovery-torque curve to be 1.

3. The method according to claim 2, wherein determining the reduction proportion of the first energy-recovery-torque curve according to the available-charging-power upper-limit value and the first target-recovery-power upper-limit value comprises:
- determining a proportional factor by using a ratio of the available-charging-power upper-limit value to the first target-recovery-power upper-limit value; and
- acquiring a predetermined correction factor, and determining the reduction proportion by using the proportional factor and the predetermined correction factor.

4. The method according to claim 1, wherein the method further comprises:
- when the available-charging-power upper-limit value is greater than or equal to the first target-recovery-power upper-limit value, controlling the driving electric motor to recover energy, and charging the battery according to the first energy-recovery-torque curve when the energy-recovery signal is detected.

5. The method according to claim 1, wherein a second target-recovery-power upper-limit value determined by using the second energy-recovery-torque curve is equal to the available-charging-power upper-limit value of the battery.

6. A computer-readable medium, wherein the computer-readable medium stores a computer-readable code, and when the computer-readable code is executed, the energy controlling method according to claim 1 is performed.

7. An energy recovery controlling system, applied to a vehicle, the vehicle comprising a driving electric motor and a battery electrically connected to the driving electric motor, wherein the vehicle is pre-configured with a first energy-recovery-torque curve for the driving electric motor, the first energy-recovery-torque curve is for representing a correspondence relationship between an energy-recovery torque of the driving electric motor and a vehicle speed, and the system comprises:
- one or more processors and a storage apparatus; and
- the storage apparatus stores a computer program which, when executed by the processor, perform the operations comprising:
  - determining a first target-recovery-power upper-limit value according to the first energy-recovery-torque curve;
  - determining an available-charging-power upper-limit value of the battery;
  - when the available-charging-power upper-limit value is less than the first target-recovery-power upper-limit value, determining an inflection-point vehicle speed according to the available-charging-power upper-limit value and the first energy-recovery-torque curve, wherein the inflection-point vehicle speed refers to a vehicle speed that corresponds to a torque point in the first energy-recovery-torque curve where an energy-recovery power is equal to the available-charging-power upper-limit value;
  - detecting an energy-recovery signal and a current vehicle speed of the vehicle, and determining a reduction proportion of the first energy-recovery-torque curve according to a result of the detection of the energy-recovery signal, the current vehicle speed, the inflection-point vehicle speed, the available-charging-power upper-limit value, and the first target-recovery-power upper-limit value;

performing a reducing adjustment to the first energy-recovery-torque curve according to the reduction proportion, to form a second energy-recovery-torque curve; and when the available-charging-power upper-limit value is less than the first target-recovery-power upper-limit value, according to the second energy-recovery-torque curve, controlling the driving electric motor to recover energy, and charging the battery when the energy-recovery signal is detected.

8. The system according to claim 7, wherein the vehicle is pre-configured with a reducing-regulation condition; and the operation comprises:

a first controlling submodule configured for, when the energy-recovery signal is detected and the current vehicle speed is greater than the inflection-point vehicle speed, controlling the reducing-regulation condition to be in an activated state;

when the energy-recovery signal is not detected, controlling the reducing-regulation condition to be in a turning-off state;

when the energy-recovery signal is detected and the current vehicle speed is less than or equal to the inflection-point vehicle speed, controlling the reducing-regulation condition to maintain being in a current state;

when the energy-recovery signal is detected and the reducing-regulation condition is in the activated state, according to the available-charging-power upper-limit value and the first target-recovery-power upper-limit value, determining the reduction proportion of the first energy-recovery-torque curve; and when the energy-recovery signal is detected and the reducing-regulation condition is in the turning-off state, determining the reduction proportion of the first energy-recovery-torque curve to be 1; and determining a proportional factor by using a ratio of the available-charging-power upper-limit value to the first target-recovery-power upper-limit value; and acquiring a predetermined correction factor, and determining the reduction proportion by using the proportional factor and the predetermined correction factor.

9. The system according to claim 7, wherein the operation of the system further comprises:

when the available-charging-power upper-limit value is greater than or equal to the first target-recovery-power upper-limit value, according to the first energy-recovery-torque curve, controlling the driving electric motor to recover energy, and charging the battery when the energy-recovery signal is detected.

10. The system according to claim 7, wherein a second target-recovery-power upper-limit value determined by using the second energy-recovery-torque curve is equal to the available-charging-power upper-limit value of the battery.

11. A vehicle, wherein the vehicle comprises the system for controlling energy recovery according to claim 7.

12. A calculating and processing device, wherein the calculating and processing device comprises:

a memory storing a computer-readable code; and one or more processors, wherein when the computer-readable code is executed by the one or more processors, the calculating and processing device implements an energy recovery controlling method, applied to a vehicle, the vehicle comprising a driving electric motor and a battery electrically connected to the driving electric motor, wherein the vehicle is pre-configured with a first energy-recovery-torque curve for the driving electric motor, the first energy-recovery-torque curve is used to indicate a correspondence relationship between an energy-recovery torque of the driving electric motor and a vehicle speed, and the method comprises the steps of:

determining a first target-recovery-power upper-limit value according to the first energy-recovery-torque curve;

determining an available-charging-power upper-limit value of the battery;

when the available-charging-power upper-limit value is less than the first target-recovery-power upper-limit value, determining an inflection-point vehicle speed according to the available-charging-power upper-limit value and the first energy-recovery-torque curve, wherein the inflection-point vehicle speed refers to a vehicle speed that corresponds to a torque point in the first energy-recovery-torque curve where an energy-recovery power is equal to the available-charging-power upper-limit value;

detecting an energy-recovery signal and a current vehicle speed of the vehicle, and determining a reduction proportion of the first energy-recovery-torque curve according to a result of the detection of the energy-recovery signal, the current vehicle speed, the inflection-point vehicle speed, the available-charging-power upper-limit value, and the first target-recovery-power upper-limit value;

performing a reducing adjustment to the first energy-recovery-torque curve according to the reduction proportion, to form a second energy-recovery-torque curve; and when the available-charging-power upper-limit value is less than the first target-recovery-power upper-limit value, according to the second energy-recovery-torque curve, controlling the driving electric motor to recover energy, and charging the battery when the energy-recovery signal is detected.

13. The device according to claim 12, wherein the vehicle is pre-configured with a reducing-regulation condition; and the step of determining the reduction proportion of the first energy-recovery-torque curve according to the result of the detection of the energy-recovery signal, the current vehicle speed, the inflection-point vehicle speed, the available-charging-power upper-limit value, and the first target-recovery-power upper-limit value comprises:

when the energy-recovery signal is detected and the current vehicle speed is greater than the inflection-point vehicle speed, controlling the reducing-regulation condition in an activated state;

when the energy-recovery signal is not detected, controlling the reducing-regulation condition in a turning-off state;

when the energy-recovery signal is detected and the current vehicle speed is less than or equal to the inflection-point vehicle speed, controlling the reducing-regulation condition to maintain a current state;

when the energy-recovery signal is detected and the reducing-regulation condition is in the activated state, according to the available-charging-power upper-limit value and the first target-recovery-power upper-limit value, determining the reduction proportion of the first energy-recovery-torque curve; and when the energy-recovery signal is detected and the reducing-regulation condition is in the turning-off state, determining the reduction proportion of the first energy-recovery-torque curve to be 1.

14. The device according to claim 13, wherein determining the reduction proportion of the first energy-recovery-torque curve according to the available-charging-power upper-limit value and the first target-recovery-power upper-limit value comprises:

determining a proportional factor by using a ratio of the available-charging-power upper-limit value to the first target-recovery-power upper-limit value; and acquiring a predetermined correction factor, and determining the reduction proportion by using the proportional factor and the predetermined correction factor.

15. The device according to claim 12, wherein the method further comprises:

when the available-charging-power upper-limit value is greater than or equal to the first target-recovery-power upper-limit value, controlling the driving electric motor to recover energy, and charging the battery according to the first energy-recovery-torque curve when the energy-recovery signal is detected.

16. The device according to claim 12, wherein a second target-recovery-power upper-limit value determined by using the second energy-recovery-torque curve is equal to the available-charging-power upper-limit value of the battery.

* * * * *